US012574984B2

(12) United States Patent
Worrall et al.

(10) Patent No.: US 12,574,984 B2
(45) Date of Patent: Mar. 10, 2026

(54) DUAL CONNECTIVITY OPERATION OF A CELLULAR NETWORK

(71) Applicant: Vodafone Group Services Limited, Newbury (GB)

(72) Inventors: Chandrika K. Worrall, London (GB); Alexey Kulakov, London (GB)

(73) Assignee: Vodafone Group Services Limited, Newbury (GB)

( * ) Notice: Subject to any disclaimer, the term of this patent is extended or adjusted under 35 U.S.C. 154(b) by 61 days.

(21) Appl. No.: 18/362,847

(22) Filed: Jul. 31, 2023

(65) Prior Publication Data

US 2024/0049320 A1     Feb. 8, 2024

(30) Foreign Application Priority Data

Aug. 5, 2022     (EP) ..................................... 22189121

(51) Int. Cl.
    *H04W 76/15*        (2018.01)
    *H04W 88/06*        (2009.01)
(52) U.S. Cl.
    CPC ............ *H04W 76/15* (2018.02); *H04W 88/06* (2013.01)
(58) Field of Classification Search
    CPC ..... H04W 76/15; H04W 88/06; H04W 24/02; H04W 76/27; H04L 1/1614
    See application file for complete search history.

(56) References Cited

U.S. PATENT DOCUMENTS

2025/0016880 A1*   1/2025   Kim ...................... H04W 88/06

FOREIGN PATENT DOCUMENTS

CN          114175842 A  *   3/2022   ........... H04L 1/0025
WO     WO-2021184418 A1  *   9/2021   ........ H04W 52/0216
WO     WO-2022032210 A1  *   2/2022   ........ H04W 36/0069

OTHER PUBLICATIONS

Futurewei, "Further discussion on UE initiated SCG fast activation", 3GPP TSG-RAN WG2 Meeting #116 bis-e, R2-2200542, Jan. 2022, pp. 5.
Huawei et al., "Remaining issues on deactivation of SCG", 3GPP TSG-RAN WG2 Meeting #116-e, R2-2110871, pp. 3.
Intention to Grant received for European Patent Application No. 22189121.1, mailed on Sep. 3, 2024, 6 pages.
LG Electronics Inc, "Acrivation and Deactivation on SCG", 3GPP TSG-RAN WG2 Meeting #113Bis-e, R2-2103570, Apr. 2021, pp. 1-4.
EP Search Report for application No. 22189121.1 dated Jan. 27, 2023.
Futurewei: "Further discussion on UE initiated SCG fast activation", 3GPP Draft; R2-2200542, 3rd Generation Partnership Project (3GPP), Mobile Competence Centre ; 650, Route Des Lucioles ; F-06921 Sophia-Antipolis Cedex ; France, vol. RAN WG2, No. E-Conference; Jan. 17, 2022-Jan. 25, 2022 Jan. 11, 2022.

(Continued)

*Primary Examiner* — Gary Mui
*Assistant Examiner* — Adam Lane Rusterholz
(74) *Attorney, Agent, or Firm* — Workman Nydegger

(57)            ABSTRACT

Dual connectivity operation of a cellular network, in which a User Equipment (UE) simultaneously operates with the cellular network using both a Master Cell Group (MCG) and a Secondary Cell Group (SCG) is configured. Activation and/or deactivation of the SCG is controlled by communicating a Medium Access Control (MAC) Control Element (CE).

7 Claims, 9 Drawing Sheets

(56)                    References Cited

OTHER PUBLICATIONS

LG Electronics Inc: "Acrivation and Deactivation on SCG", 3GPP Draft; R2-2103570, 3rd Generation Partnership Project (3GPP), Mobile Competence Centre ; 650, Route Des Lucioles ; F-06921 Sophia-Antipolis Cedex ; France, vol. RAN WG2, No. Online; Apr. 12, 2021-Apr. 20, 2021 , Apr. 2, 2021.

Huawei et al: "Remaining issues on deactivation of SCG", 3GPP Draft; R2-2110871, 3rd Generation Partnership Project (3GPP), Mobile Competence Centre ; 650, Route Des Lucioles ; F-06921 Sophia-Antipolis Cedex ; France, vol. RAN WG2, No. Online; Nov. 1, 2021-Nov. 12, 2021 , Oct. 21, 2021.

* cited by examiner

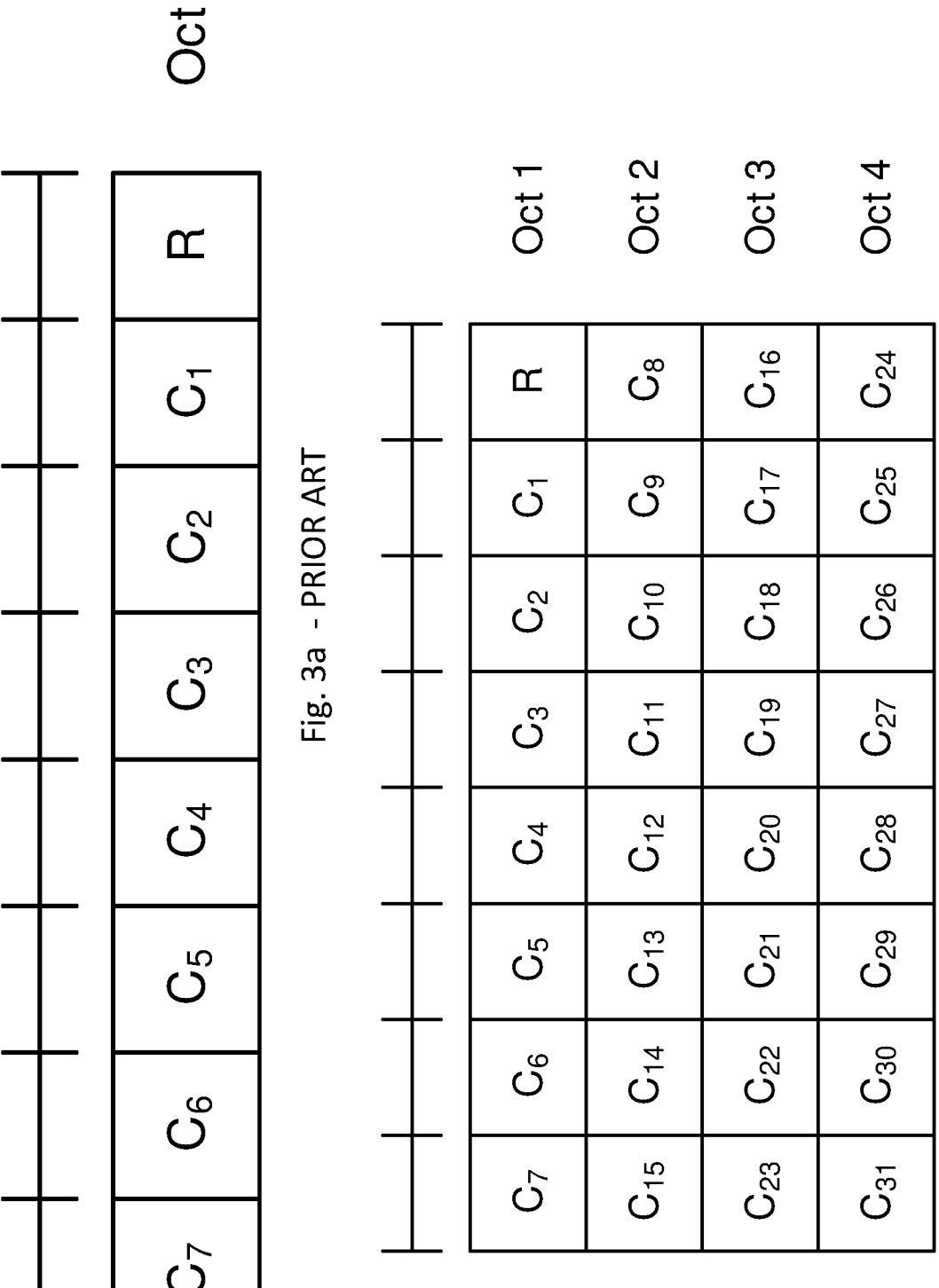
Fig. 3a - PRIOR ART
Fig. 3b – PRIOR ART

| | Oct 1 | Oct 2 | Oct 3 | Oct 4 | Oct 5 | | Oct N+4 |
|---|---|---|---|---|---|---|---|
| | R | $C_8$ | $C_{16}$ | $C_{24}$ | | | |
| | $C_1$ | $C_9$ | $C_{17}$ | $C_{25}$ | | | |
| | $C_2$ | $C_{10}$ | $C_{18}$ | $C_{26}$ | | | |
| | $C_3$ | $C_{11}$ | $C_{19}$ | $C_{27}$ | TRS $ID_1$ | ... | TRS $ID_N$ |
| | $C_4$ | $C_{12}$ | $C_{20}$ | $C_{28}$ | | | |
| | $C_5$ | $C_{13}$ | $C_{21}$ | $C_{29}$ | | | |
| | $C_6$ | $C_{14}$ | $C_{22}$ | $C_{30}$ | | | |
| | $C_7$ | $C_{15}$ | $C_{23}$ | $C_{31}$ | | | |

Fig. 3d

DUAL CONNECTIVITY OPERATION OF A CELLULAR NETWORK

CROSS-REFERENCE TO RELATED APPLICATIONS

This application claims priority from EP Patent Application No: 22189121.1, filed Aug. 5, 2022, which is expressly incorporated by reference herein in its entirety.

TECHNICAL FIELD OF THE DISCLOSURE

The disclosure concerns simultaneous operation of a User Equipment (UE) with a first cellular network as a first subscriber and with a second cellular network as a second, different subscriber. It also concerns configuring operation of a UE, for instance with more than one cell, for example, using Carrier Aggregation (CA) and/or Dual Connectivity (DC) operation. A suitably configured network entity and/or UE are also considered.

Background to the Disclosure

User Equipment (UE) is increasingly provided with the ability to use multiple subscribers simultaneously. This is achieved by the use of more than one Subscriber Identity Module (SIM or USIM). For example, one SIM can be used for personal connection, while another SIM is used for business data. Another example is the use of one SIM for voice and another SIM for data services, each with different tariffs.

Support for multi-SIM operation at the UE has not generally been considered as part of Third Generation Partnership Project (3GPP) standardisation. However, in Rel-17, 3GPP considered support for UE paging from multiple networks and specifically how to avoid paging collision (where both networks expect paging responses from one UE at the same time) and to switch networks.

Paging collision avoidance addresses the overlap of paging occasions on the networks for different SIMs on the same UE, when the UE is in "RRC_Idle" or "RRC_Inactive" states in both the networks associated with the respective SIM. In order to address this, the UE may determine potential paging collision on two networks and may trigger actions to prevent potential paging collision, specifically on Evolved Universal Mobile Telecommunications System (UMTS) Terrestrial Radio Access (E-UTRA) connected to Evolved Packet Core (EPC) or E-UTRA connected to 5G Core Network (5GC). In Technical Specification (TS) 36.304, 3GPP has defined an alternative International Mobile Subscriber Identity (IMSI), based on the combination of a IMSI with an Accepted IMSI Offset. If an Accepted IMSI Offset is forwarded by upper layers, UE Access Stratum (AS) shall use the IMSI Offset value and IMSI to calculate the alternative IMSI value. Here, IMSI is used for the UE ID in paging offset calculation for the second network. UE AS and Non-Access Stratum (NAS) interaction and detailed behaviour have been left to implementation. These solutions focus on UE reachability in "RRC_Idle" and "RRC_Inactive" states, especially for UEs with a single transmitter and receiver.

To assist with UE network switching, each network can configure at most three gaps patterns for multi-SIM devices. These can include two periodic gap patterns and a single aperiodic gap pattern. Switching Gaps (periodic or aperiodic) are configured or released by Radio Resource Control (RRC) signalling (for example, a "RRCReconfiguration"

message). The UE provides assistance information to the gNB of the first network (NW A) in "Connected" state based on a configuration of a USIM for the second network (NW B). This allows the gNB to determine the switching parameters. The network decides which action to take based on UE assistance information.

If the UE prefers to leave the "RRC_Connected" state during multi-SIM operation or to be kept in "RRC_Connected" state in NW A, while temporarily switching to NW B, the UE can inform the network of its preference. The network can again make a decision on switching parameters, taking into account the UE preference.

If the network configures a gap pattern to the UE for multi-SIM operation, the gap pattern consists of a gap length (3, 4, 6, 10, 20 ms), gap repetition (20, 40, 80, 160, 320, 64, 1280, 2560, 5120 ms), gap offset (start point within gap repetition), gap starting SFN and whether the gap is periodic or aperiodic. During a switching procedure for leaving the "RRC_Connected" state, the UE is allowed to enter "RRC_Idle" state if it does not receive response message from the network within a certain configured time period.

These approaches are focused on UE reachability in "RRC_Idle" or "RRC_Inactive" states, especially when the UE has only one transmitter and one receiver. In Rel-18, these aspects are being extended for multi-SIM devices in a "RRC_Connected" state. A UE in this state should be able to switch from a first network to a second network, to receive communications from the second network without leaving the first network. It would also be advantageous to consider UEs with multiple transmitters and/or receivers. This would enhance the fully connected experience for a multi-SIM UE.

SUMMARY OF THE DISCLOSURE

Against this background, there are provided methods for configuring operation in respect of a UE that is configured to operate with a first cellular network as a first subscriber and to operate simultaneously with a second cellular network as a second, different subscriber according to the claims. There are also provided methods for configuring dual connectivity operation of a cellular network, in which a UE simultaneously operates with the cellular network using both a Master Cell Group (MCG) and a Secondary Cell Group (SCG) as claimed. A computer program, a UE and a network entity are also defined by respective claims. All aspects and/or features as herein described can be combined.

In one aspect, there is an approach for configuring operation of the UE with the first cellular network based on a communication activity pattern for the UE with the second cellular network. A network entity (for example, a Master Node, MN) of the first cellular network receives the communication activity pattern (which can come from a network entity, for instance a MN, of the second network or from the UE) and uses this to control the UE operation on the first network. Conversely, the UE or the network entity of the second cellular network may communicate to a network entity of the first cellular network, information on a communication activity pattern for the UE with the second cellular network. This may hence allow the network entity of the first cellular network to configure operation of the UE with the first cellular network. Where the UE communicates the communication activity pattern, this may be in the form of preference for a temporary capability limitation.

This approach is especially advantageous where the UE is configured for simultaneous multi-cell operation with the first cellular network, for instance using a first cell and second cell. For example, this may use a master cell group and a secondary cell group (in Dual Connectivity, DC, operation) or a primary cell (PCell) and a secondary cell (SCell) (in Carrier Aggregation, CA, operation). Then, the configuring or control of UE operation may include controlling activation and/or deactivation of the second cell with the UE, based on the received communication activity pattern. For instance, the second cell may be deactivated in response to user data for transmission to the UE arriving at the second cellular network.

RRC signalling may be used for this purpose (especially for SCG activation/deactivation), according to certain implementations. Alternatively, a Medium Access Control (MAC) Control Element (CE) can be used for controlling activation and/or deactivation of the second cell with the UE (especially for SCell activation/deactivation). The MAC CE may include Tracking Reference Signal (TRS) data and/or an extended Logical Channel ID (eLCID) portion.

Sending the communication activity pattern for the UE may be triggered by identifying that user data for transmission to the UE has arrived at the second cellular network (for instance, because this is seen at the second cellular network or because the data is received at the UE).

In another aspect (which can be combined with any other aspect described herein), DC operation of a cellular network can be configured by controlling activation and/or deactivation of a SCG by communicating a MAC CE. This differs from the existing RRC signalling used for controlling SCG activation/deactivation and may allow dynamic control and/or control according to an activity pattern. This may be similar to the existing MAC CE for controlling SCell activation/deactivation.

The MAC CE may comprise a portion (in terms of its structure and may equivalently be considered information) to instruct either activation or deactivation of the SCG. Advantageously, the MAC CE comprises an identifier for the SCG. The MAC CE may comprise a Logical Channel ID, LCID, portion and/or an extended LCID, eLCID, for identifying characteristics and/or a destination for data in the MAC CE.

Some features may be applied to the new MAC CE for SCG control and existing MAC CE for SCell control. For example, the MAC CE may indicate at least one time period for activation or deactivation of the SCG (or SCell). Indicating an activity time period (in advance) for the SCG or SCell may reduce signalling requirements, as an additional MAC CE is not needed for each activation and/or deactivation event. This may constitute an additional aspect of the disclosure (again, combinable with any other aspect). Optionally, the MAC CE may indicate a plurality of time periods for activation or deactivation of the SCG (or SCell). This may be implemented by indicating a time period with reference to at least one radio frame and a rate of repetition for the time period.

The UE is configured to operate with the cellular network as a first subscriber and further configured to operate simultaneously with a second cellular network as a second, different subscriber (that is, multi-SIM operation). Controlling activation and/or deactivation of the SCG by communicating a MAC CE is beneficially in response to activity of the UE with the second cellular network. As noted above, this aspect may be combined with other aspects.

In accordance with another aspect (which can be combined with any other aspect), a communication activity pattern for the UE can be defined. This advantageously indicates a start time and end time for the communication activity with reference to a period of at least one radio frame.

This may allow the first and/or second networks to be configured for simultaneous communication with the UE during the time indicated by the communication activity pattern. For example, the communication activity pattern can be used for indicating the communication activity to a network entity of the first cellular network (as discussed above, where the activity is of the UE with a second cellular network) or for controlling activation/deactivation of a second cell (SCG or SCell, for instance). The communication activity pattern may be provided in RRC signalling or MAC CE.

The end time is optionally indicated by communication of a duration from the start time. The start time may be indicated with reference to both: a time from a start of a single radio frame (in seconds, a derivative or seconds, for instance milliseconds, or a number of sub-frames); and a number of a radio frame from a group of multiple radio frames (for instance, the number '1' indicating that the first activity is in the first radio frame).

The communication activity pattern may repeat. The pattern may repeat every frame or every group of frames (for example, a pattern repeating every three frames). The repetition is beneficially indicated by communicating a number of radio frames for which the communication activity is repeated. The repetition may be indicated by communicating a duration of the period of at least one radio frame (that is, the number of radio frames over which the pattern is defined). Alternatively, the repetition may be indicated by communicating a bit map indicating radio frames for which the communication activity applies.

BRIEF DESCRIPTION OF THE DRAWINGS

The disclosure may be put into practice in a number of ways and preferred embodiments will now be described by way of example only and with reference to the accompanying drawings, in which:

FIG. 3a depicts a Medium Access Control (MAC) Control Element (CE) structure for secondary cell (SCell) activation or deactivation using one octet from 3GPP TS 38.321, v.17.1.0, section 6.1.3.10;

FIG. 3b depicts a MAC CE structure for SCell activation or deactivation using four octets from 3GPP TS 38.321, v.17.1.0, section 6.1.3.10;

FIG. 3d depicts a MAC CE structure for enhanced SCell activation or deactivation using four octets for activation or deactivation from 3GPP TS 38.321, v.17.1.0, section 6.1.3.55;

DETAILED DESCRIPTION OF PREFERRED EMBODIMENTS

Figure 1:
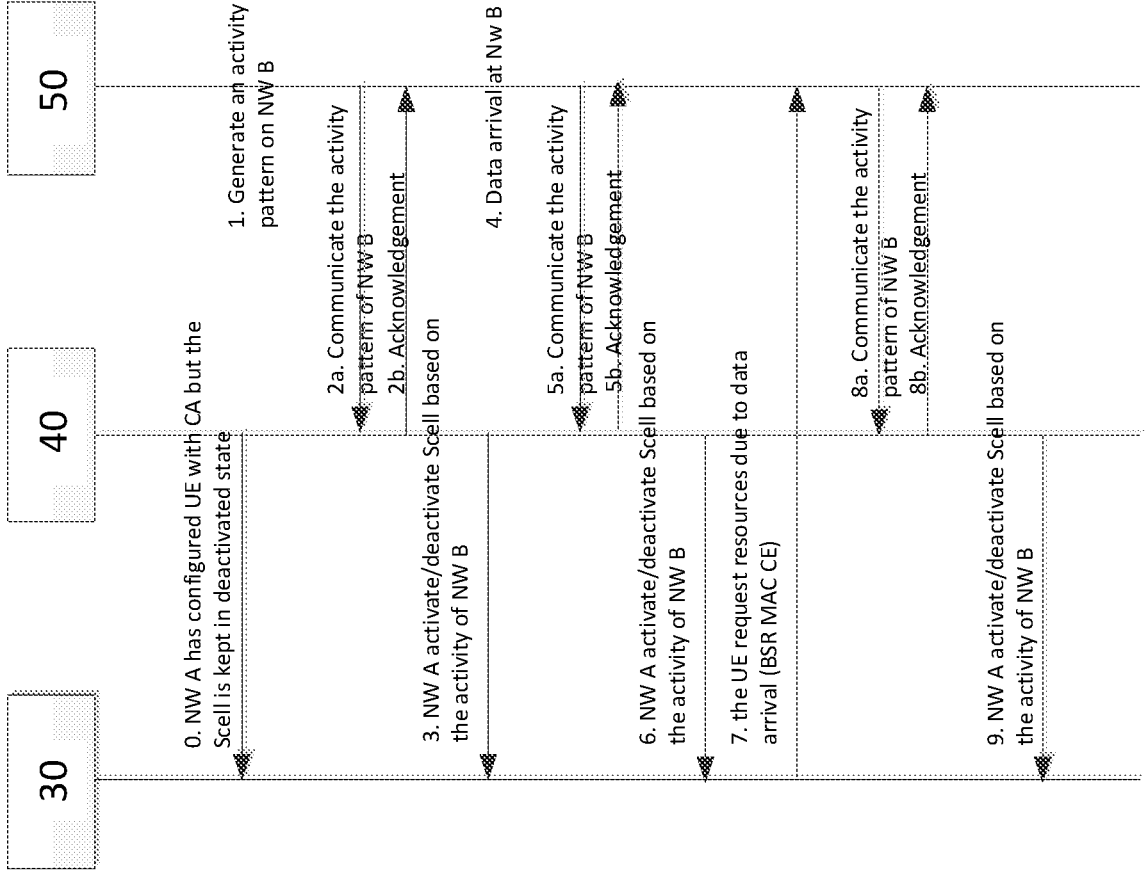
FIG. 1 schematically shows communication flows for a first implementation of a first aspect of the disclosure.

The present disclosure describes a number of aspects, each of which can be considered individually. The combination of these aspects (or even just the combination of one more features from one aspect with another aspect) is also provided.

As noted above, 3GPP Rel-18 seeks to improve connectivity for multi-SIM UEs, especially in the "RRC_Connected" state. It is noted that certain features are not supported in 3GPP Rel-17. The UE is not allowed to enter the "RRC_Inactive" state if no response message is received from the network. Also, the UE must receive a response from the network for a configured time and leave "RRC_Connected" to perform switching. These limitations are workable for UEs that generally remain in the "RRC_Idle" state, but limit the benefits for UE operating in the "RRC_Connected" state.

Also, there is limited support for multi-SIM UEs using multiple cells from the same network, such as Carrier Aggregation (CA) and Dual Connectivity (DC). Autonomous gaps for Multi-SIM UEs are not supported. Only per UE level scheduling gap is supported for UEs not using DC. Gap support for Multi-SIM UEs using Multi-Radio DC (MR-DC) is also not supported.

It has been recognised that for a multi-SIM UE with more than one transmitter and/or receiver (allowing CA and/or DC operation, for instance), it may be possible to use a first transmitter and/or receiver with a first network (with a first SIM) and a second transmitter and/or receiver with a second network (with a second SIM). CA operation uses a Primary cell (PCell) and secondary cell (SCell) and DC operation uses a Master Cell Group (MCG) and a Secondary Cell Group (SCG). However, operation with a second cell of one network (SCell or SCG) may not be possible at the same time as simultaneous operation with two different networks. Deactivating and subsequently reactivating the second cell may therefore allow efficient multi-cell operation Activation and deactivation of SCell and SCG are both supported in existing network architecture. Activation/deactivation of SCell is possible with MAC layer signalling. For a deactivated SCell, the UE stops the sCellDeactivationTimer and bwp-InactivityTimer; deactivates any active Bandwidth Parts (BWPs), clears any configured downlink assignment and any configured uplink grant Type 2, clears any PUSCH resource for SPS CSI reporting, suspends any configured uplink grant Type 1, flushes all HARQ buffers, cancels triggered consistent listen-before-talk (LBT) failure. In addition, SRS, UL-SCH, RACH, PUCCH channels are not transmitted and PDCCH channel is not monitored and CSI is not reported. Therefore, the UE power is saved. As there is not much activity on the deactivated SCell, the transmitter and receiver can be used on a different cell or, in the context of the present disclosure, another network.

Alternatively, in order to allow for fast SCell activation, the SCell can be kept in activated state with one BWP configured as a dormant BWP. CSI measurement can be performed on the dormant BWP but not reported. This means limited predictable activities are possible on the configured BWP. This configuration also saves the UE power and allows for fast activation of the SCell upon data arrival.

Deactivated SCG is also possible in existing network architectures. In a deactivated SCG, the UE does not transmit SRS and CSI on the UL-SCH or PUCCH channels. The UE does not monitor the PDCCH channel and does not trigger Random Access. Therefore, the UE transmitter and receiver could again be shared among different networks, while the SCG is deactivated.

According to an aspect of the present disclosure, there are provided techniques for activating and/or deactivating a second cell (for example, SCell or SCG) in order to meet the desiderata and/or requirements of a multi-SIM UE. In one implementation, the activation and/or deactivation of the second cell is based on a communication activity pattern for the multi-SIM UE with another (a second) network. This communication activity pattern can be obtained from the other network or from the UE.

For both activation/deactivation of SCell and activation/deactivation of SCG, MAC layer signalling is preferred. This is because MAC signalling is faster compared to RRC signalling. Thus, the UE can be in an activated state quickly and the data delivery can be resumed fast. According to an aspect of the disclosure, a MAC Control Element (CE) for activation and/or deactivation of a SCG is provided. This provides fast control.

In a first aspect of the disclosure, control of a second cell based on a communication activity pattern is provided. These will be described with reference to SCell control in CA, but can equivalently be implemented for SCG control in a DC configuration. Referring now to FIG. 1, there are schematically shown communication flows for a first implementation of this aspect. This shows flows between: a UE 30 having dual transmitters and dual receivers, a SIM for communication with a first network (NW A) and a SIM for communication with a second network (NW B); a Master Node of NW A 40; and a Master Node of NW B 50. A backhaul link (not shown) is provided between the first network NW A and the second network NWB.

The first network NW A makes a decision on UE capability restriction depending on the activities on the second network NW B. The UE is connected to both the first network NW A and the second network NW B. The UE is configured with CA (PCell and Scell) in network A. According to an embodiment of this aspect, the Scell is kept in deactivated state and the activation of SCell is controlled according to the UE activities in the second network NW B. The second network NW B makes the decision on whether there is data transmission in NW B based on legacy mechanism Buffer Status Report (BSR), Downlink (DL) data arrival and configuration on NW B. NW B communicates high or less activity to the first network NW A according to communications flow of FIG. 1.

Step 0: NW A has configured the UE 30 with CA. The SCell is kept in deactivated state.

Step 1: NW B generates an activity pattern of the UE 30 based on the UE configuration and the information NW B has about the UE 30.

Step 2: MN of NW B 50 communicates the activity pattern of the UE on NW B to the MN of NW A 40.

Step 3: MN of NW A 40 activates the deactivated Scell based on the activities of the UE 30 on NW B.

Step 4: Data arrival at NW B.

Step 5: MN of NW B 50 informs MN of NW A 40 of the activity.

Step 6: MN of NW A 40 deactivates the Scell in order to allow activity on NW B.

Step 7: Uplink (UL) data is ready for transmission to NW B. The UE 30 informs MN of NW B 50 of this by transmitting BSR.

Step 8: The MN of NW B 50 communicates the activity of the UE 30 to the MN of NW A 40.

Step 9: MN of NW A 40 deactivates the Scell to allow for communication on NW B.

This implantation thereby achieves dynamic sharing of the UE transmitter and/or receiver in both the first network NW A and the second network NW B.

Figure 2:
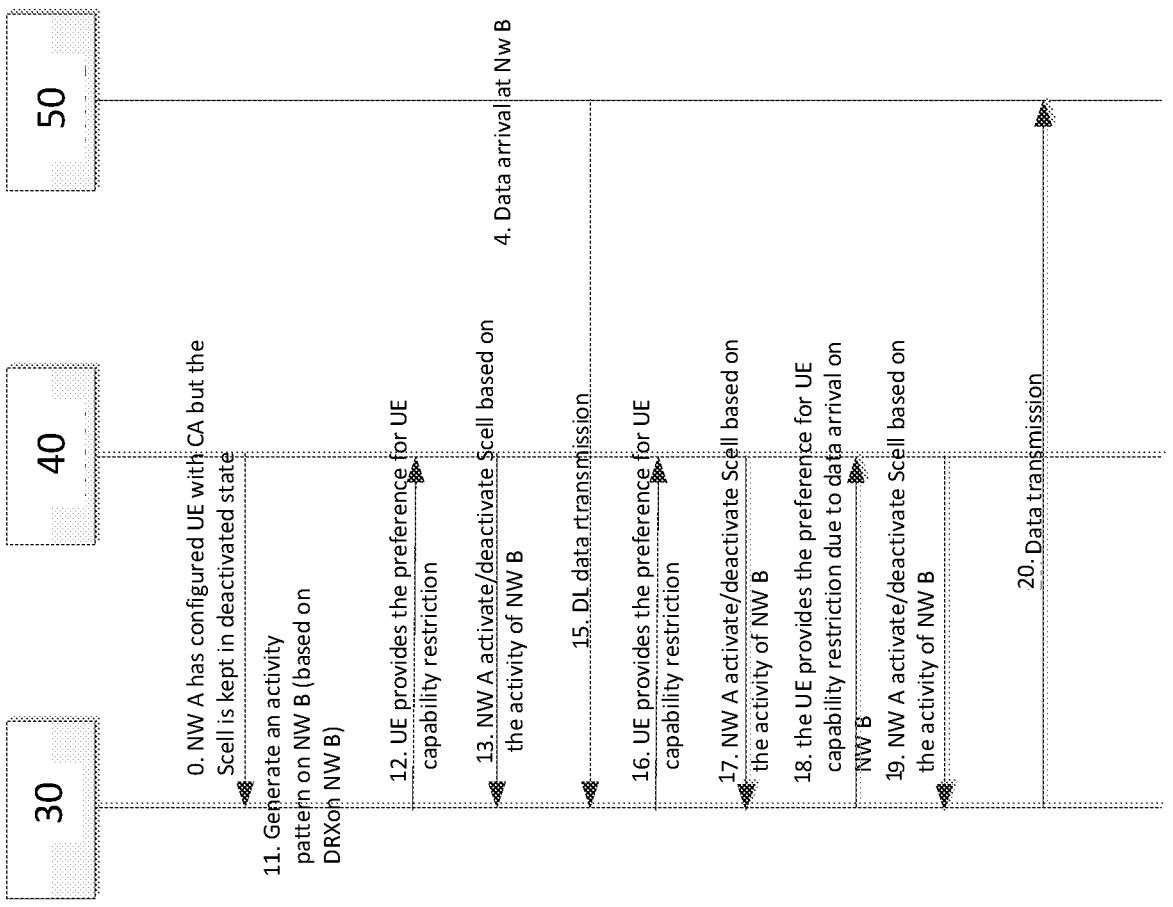
FIG. 2 schematically shows communication flows for a second implementation of the first aspect of the disclosure.

In an alternative implementation, the UE provides the activity pattern to NW A, rather than NW B. Referring next to FIG. 2, there are schematically shown communication flows for a second implementation according to this aspect. Where the same features and/or steps are shown as in FIG. 1, the same reference numerals are used.

In this case, the UE 30 generates an activity pattern for its activity with NW B based on its configurations. The activity pattern on NW B is provided to the MN of NW A 40 by the UE 30. Alternatively, the UE 30 generates a UE preference on UE capability restriction based on the activities (based on the configuration from the second network NW B) and indicates the UE capability preference to the MN of the first network NW A4 40.

Step 0: NW A has configured the UE with CA. The SCell is kept in deactivated state.

Step 11: The UE 30 generates an activity pattern of the UE 30 based on the UE configuration by the NW B.

Step 12: The UE 30 communicates the capability restriction to the MN of NW A 40.

Step 13: MN of NW A 40 activates the deactivated Scell based on the capability restriction preferences of the UE 30.

Step 4: Data arrival at NW B.

Step 15: MN of NW B 50 transmits the data to the UE 30.

Step 16: The UE provides a new temporary UE capability restriction to the MN of NW A 40 based on the activity on NW B.

Step 17: MN of NW A 40 deactivates the SCell in order to allow for activity on NW B.

Step 18: UL data is ready for transmission to NW B. The UE 30 informs the MN of NW A 40 of a new UE capability limitation.

Step 19: MN of NW A 40 deactivates the SCell in order to allow for activity on NW B.

Step 20: The UE 30 starts a data transmission procedure by requesting resources (by sending BSR) to the MN of NW B 50 and transmits data to MN of NW B 50 on the resources granted by the NW B.

The legacy procedure for activation/deactivation of SCell and activation/deactivation of SCG on NW A can used in all implementations according to this first aspect, to dynamically control the scheduling in NW A based on the UE activity on NW B. Control (activation/deactivation) of SCell is currently implemented by an existing MAC CE, as will be described below. Control (activation/deactivation) of SCG is currently implemented by RRC signalling.

Control of SCell activation and/or deactivation by a MAC CE is described in 3GPP TS 38.321, v.17.1.0, section 6.1.3.10. As discussed there, there are two types of SCell Activation/Deactivation MAC CEs. Referring now to FIG. 3a, there is depicted a first type of MAC CE for SCell activation and/or deactivation using one octet. This is identified by a MAC sub-header with a specific Logical Channel ID (LCID). It has a fixed size with seven C-fields and one R-field. If there is a SCell configured for the MAC entity with SCellIndex i, the $C_i$ field indicates the activation/deactivation status of that SCell. Otherwise, the MAC entity ignores the respective $C_i$ field. The $C_i$ field is set to 1 to indicate that the SCell with SCellIndex i shall be activated. The $C_i$ field is set to 0 to indicate that the SCell with SCell Index i shall be deactivated. In addition, there is a Reserved bit (R), set to 0.

With reference to FIG. 3b, there is depicted a MAC CE structure for SCell activation or deactivation of a second type using four octets and is identified by a MAC sub-header with specific LCID. It has a fixed size with 31 C-fields and one R-field.

Figure 3C:
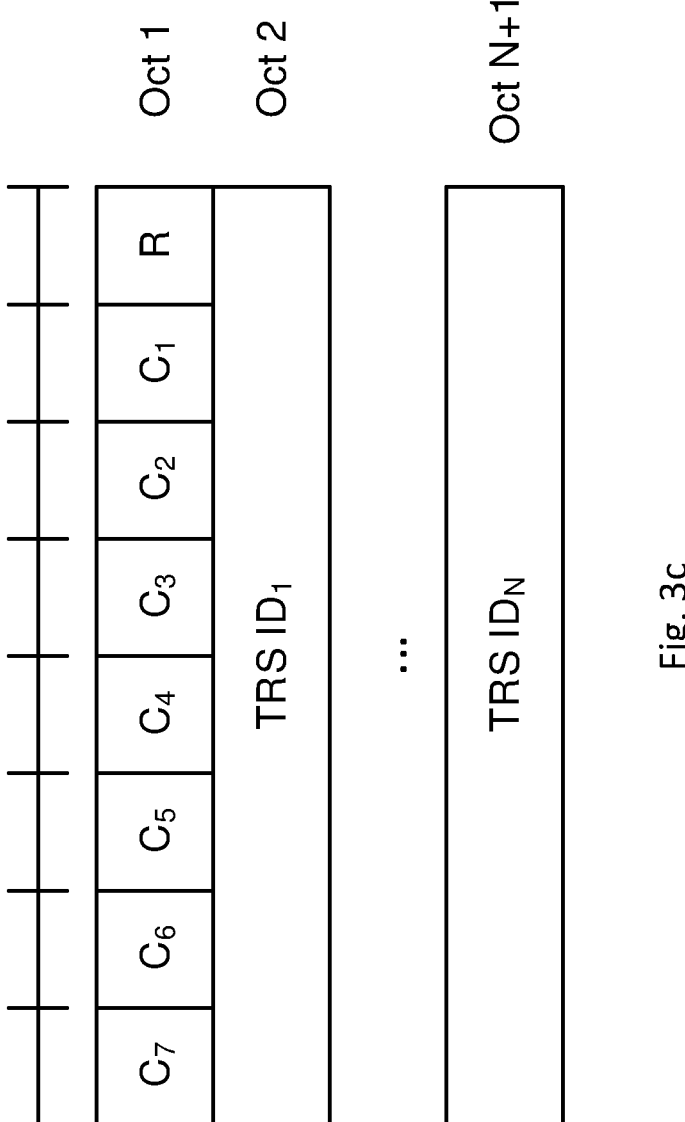
FIG. 3c depicts a MAC CE structure for enhanced SCell activation or deactivation using one octet for activation or deactivation from 3GPP TS 38.321, v.17.1.0, section 6.1.3.55.

The SCell Activation/deactivation MAC CEs can be further enhanced to include a Tracking Reference Signal (TRS) ID field as discussed in 3GPP TS 38.321, v.17.1.0, section 6.1.3.55. TRS information provides Channel State Information—Reference Signal (CSI-RS) for tracking. Referring now to FIGS. 3c and 3d, there are depicted MAC CE structures for such enhanced SCell activation or deactivation using one octet (FIG. 3c) and four octets (FIG. 3d). The enhanced SCell Activation/Deactivation MAC CE is identified by a MAC sub-header with specific extended LCID (eLCID). It has a variable size and consists of C-fields, R-field and several TRS ID fields. Each TRS $ID_j$ corresponds to the i$^{th}$ SCell that shall be activated according to $C_i$ in ascending order of SCellIndex of the SCell and corresponding $C_i$ is set to 1. If TRS configuration ID in TRS $ID_j$ is set to a non-zero value, it indicates the corresponding TRS address by scellActivationRS-Id is activated. If TRS configuration ID in TRS $ID_i$ is set to zero, it indicates that no TRS is used for the corresponding SCell.

According to a general sense of the disclosure, there may be considered a method for configuring operation of a UE with a first cellular network as a first subscriber, with the UE simultaneously operating with a second cellular network as a second, different subscriber. The method comprises: receiving, at a network entity of the first cellular network, information on a communication activity pattern for the UE with the second cellular network; and configuring operation of the UE with the first cellular network based on the received communication activity pattern.

Preferably, the UE is configured for simultaneous operation with the first cellular network using both a master or primary cell (for dual connectivity operation a Master Cell Group, MCG and for carrier aggregation operation a primary cell, PCell) and a secondary cell (for dual connectivity operation a Secondary Cell Group, SCG and for carrier aggregation operation a secondary cell, SCell). Then, the step of configuring operation of the UE with the first cellular network may comprise controlling activation and/or deactivation of the secondary cell with the UE based on the received communication activity pattern. For dual connectivity operation, controlling activation and/or deactivation of the SCG with the UE may comprise communicating RRC signalling, whereas for carrier aggregation operation, controlling activation and/or deactivation of the SCell with the UE may comprise communicating a MAC CE. The MAC CE may further include TRS data and/or comprise a eLCID portion.

Advantageously, controlling activation and/or deactivation of the secondary cell of the first cellular network with the UE may be achieved by deactivating the secondary cell in response to user data for transmission to the UE arriving at the second cellular network. For example, arrival of the user data at the second cellular network may prompt the communication of the information on a communication activity pattern for the UE with the second cellular network to the first cellular network. This may then prompt the first cellular network to deactivate the secondary cell.

The information on a communication activity pattern for the UE with the second cellular network may be communicated from a network entity of the second cellular network to the network entity of the first cellular network. Additionally or alternatively, the information on a communication activity pattern for the UE may be communicated from the UE to the network entity of the first cellular network (for example, in the form of a UE preference for a temporary capability limitation).

In another sense, there may be considered another method for configuring operation of a UE with a first cellular network as a first subscriber, where the UE simultaneously operates with a second cellular network as a second, different subscriber. The method comprises communicating from the UE or from a network entity of the second cellular network to a network entity of the first cellular network, information on a communication activity pattern for the UE with the second cellular network, in order to allow the network entity of the first cellular network to configure operation of the UE with the first cellular network. These methods may be combined and optional and/or preferable from each method may be included in the other method.

In some implementations, it may be identified that user data for transmission to the UE has arrived at the second cellular network. In response, the information on a communication activity pattern for the UE may be communicated. The identifying may be at the second cellular network, but it could additionally or alternatively include receiving the user data at the UE.

Implementations according to the above-described aspects may be in the form of a computer program (software), within a network entity of a cellular network or within a UE. Further generalised aspects and/or details will be discussed below. Before this, additional details of specific implementations will be described.

As detailed above, existing network architecture uses RRC signalling to control (activate/deactivate) SCG. This is not as fast as MAC signalling and may not be sufficient for dynamic control. According to a second aspect of the disclosure, dynamic SCG activation and/or deactivation using MAC layer signalling is provided. According to one embodiment in line with this aspect, a new MAC CE for activation and/or deactivation of SCG is proposed.

Figures 4A, 4B:
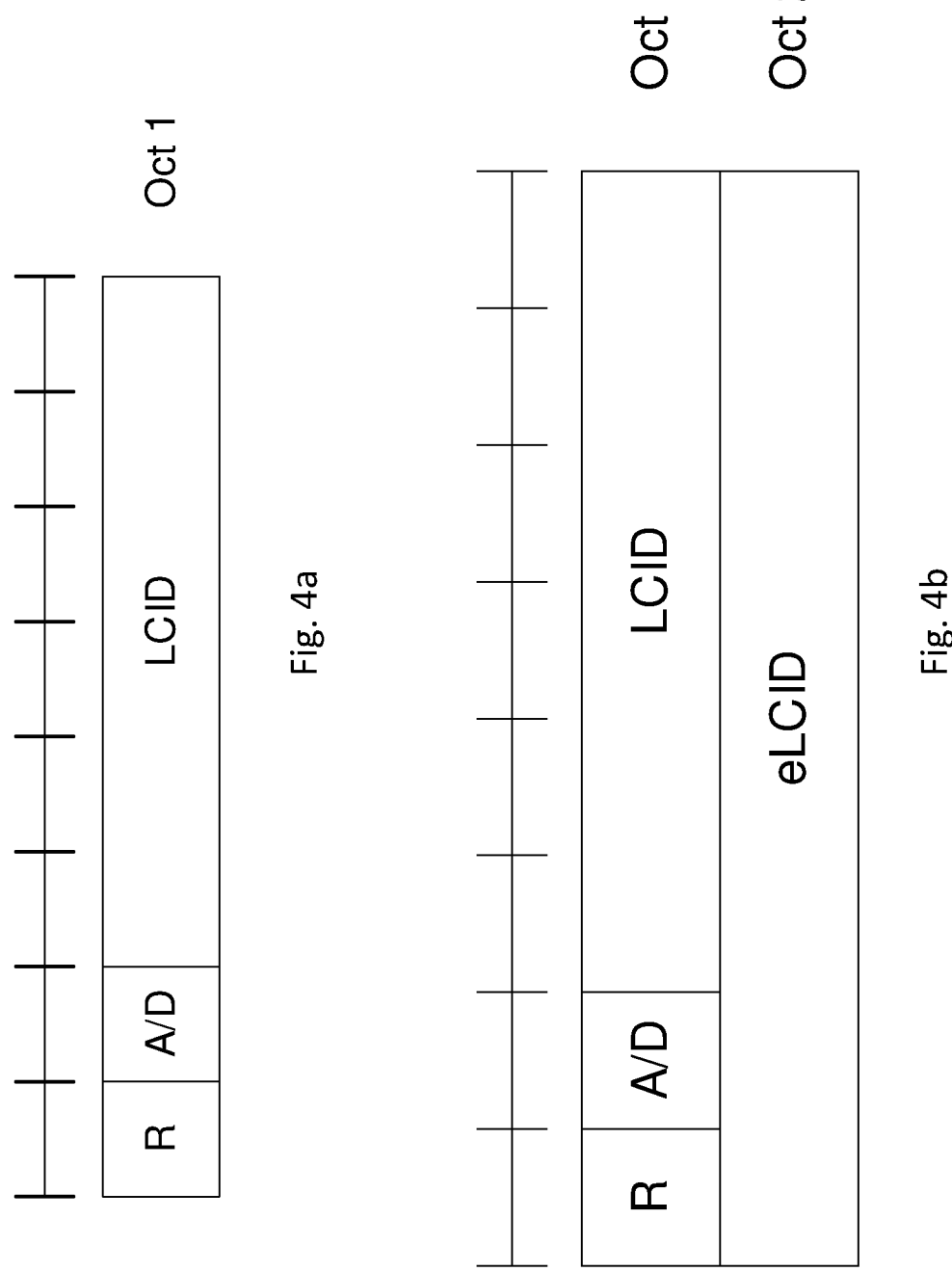
FIG. 4a illustrates a MAC CE structure for Secondary Cell Group (SCG) activation or deactivation using one octet according to a first implementation of a second aspect of the disclosure.
FIG. 4b illustrates a MAC CE structure for Secondary Cell Group (SCG) activation or deactivation using two octets according to a second implementation of the second aspect of the disclosure.

Referring now to FIG. 4a, there is illustrated a MAC CE structure for SCG activation or deactivation using one octet according to a first implementation of this aspect. This comprises: a reserved field (R); a SCG activation/deactivation field (A/D); and a LCID. There is only one SCG configured for a Master Node at a given time. If the A/D field is set to 1, SCG is to be activated. If the A/D field is set to 0, SCG is deactivated.

Next, reference is made to FIG. 4b, illustrating a MAC CE structure for SCG activation or deactivation using two octets according to a second implementation of this aspect. Where the same features are illustrated as in FIG. 4a, the same reference signs are used. Rather than using a LCID field, this implementation uses an extended LCID (eLCID) field, so a two octet MAC CE is employed.

According to a general sense of the disclosure, there may be considered a method for configuring dual connectivity operation of a cellular network, in which a UE simultaneously operates with the cellular network using both a MCG and a SCG. The method comprises controlling activation and/or deactivation of the SCG by communicating a MAC CE. This may improve the dynamic and efficient control of SCG activation and/or deactivation. This may be implemented as a computer program (software) or within a network entity of a cellular network.

The MAC CE advantageously comprises a portion to instruct either activation or deactivation of the SCG. For example, this portion (in the form of a portion of the structure or a data element or information) may simply be a single bit indicating activation or deactivation.

Preferably, the MAC CE (and more preferably, its subheader) comprises an identifier for the SCG. This allows the instruction in the MAC CE to be directed accordingly.

In some implementation, the MAC CE comprises a LCID portion and/or a eLCID portion, for identifying characteristics and/or a destination for data in the MAC CE.

In this aspect, the UE is preferably configured to operate with the cellular network as a first subscriber and further configured to operate simultaneously with a second cellular network as a second, different subscriber. In other words, this aspect is especially suited to use with multi-SIM UE devices.

Further details according to this generalised aspect will be considered below. First, additional specific implementations are discussed.

One drawback in the implementations described above, in which activation/deactivation of SCell or SCG by MAC CE or RRC signalling is that this the signalling is transmitted every time that a second cell is to be activated and every time it is to be deactivated. This creates unnecessary signalling overhead.

Since activity on the second network NW B could be represented by an activity pattern, the activation and/or deactivation instructions could also be represented by an activation/deactivation pattern. This way the signalling overhead can be reduced without affecting the performance of the functionality.

With reference to the generalised senses of the disclosure, discussed above, a MAC CE for controlling activation and/or deactivation of a SCG (or equivalently any other type of second cell from the same network, such as a SCell and where SCG is used below, it may refer to other types of second cell) may further indicate at least one time period for activation or deactivation of the SCG. This may allow advance control of the SCG (or other second cell) activation and/or deactivation, to reduce the signalling overhead and improve the speed of operation.

Optionally, the MAC CE indicates a plurality of time periods for activation or deactivation of the SCG. For example, the MAC CE may indicate a plurality of time periods for activation or deactivation of the SCG by indicating a time period with reference to at least one radio frame and a rate of repetition for the time period. As an example of this, the MAC CE may indicate that the SCG should be deactivated for every second sub-frame in alternate frames or indicate that the SCG should be deactivated for every fifth and sixth sub-frame in every fourth frame.

Other patterns for activation and/or deactivation will be readily apparent based on these examples.

More generalised aspects and/or details will be detailed below. Before this, specific implementations and their operation will be described.

It will be recognised from the above that efficient signalling of the activity pattern is useful in connection with the signalling from one network to another or from a UE to a network, in order to control second cell activation and/or deactivation. An efficient technique for signalling an activity and/or activation/deactivation pattern will now be discussed according to a third aspect.

Figure 5:
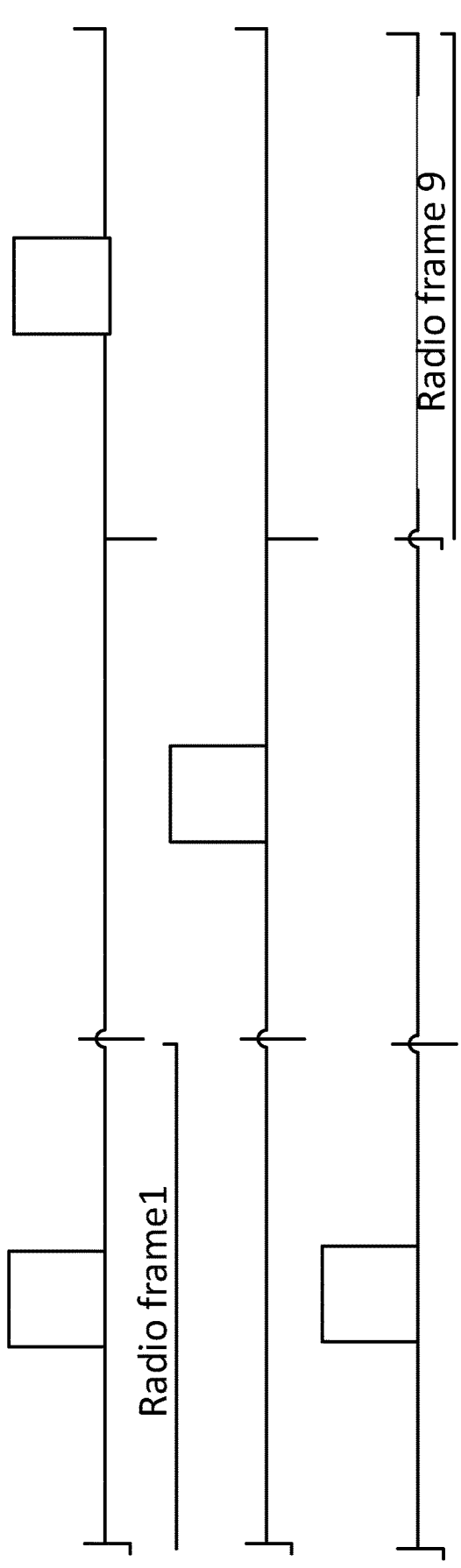
FIG. 5 shows a schematic illustration of an example periodic activity pattern for a UE with a cellular network.

Referring to FIG. 5, there is shown a schematic illustration of an example periodic activity pattern for a UE with a cellular network. The activity pattern comprises a two-frame repeating pattern starting from the first frame and repeating four times, in which the first frame comprises activity 5 ms after the start of the radio frame and lasting 2 ms. This could be described by the following parameters: activity duration (D) in ms; activity repetition period (Re), for instance, at the level of radio frames; start point of activity period with respect to the start of radio frame (S) in ms; starting system radio frame number of the activity (SFN); and number of radio frames for which the pattern is repeated (Nu). Thus, the pattern shown in FIG. 5 has the parameters D=2, Re=2, S=5, SFN=1 and Nu=8. These parameters thus provide an efficient indication of an activity pattern. The parameter Nu could alternatively indicate the number of repetitions of the pattern, rather than the number of frames for which the pattern applies.

A slight variant on this approach is to replace Re and SFN by a bitmap. The bitmap is designed to represent n number of radio frames. Each bit in the bitmap indicates whether there is any activity in the respective radio frame. If the bitmap indicates activity in the radio frame (for example, by a '1'), the parameters D and S apply and if the bitmap indicates no activity in the radio frame (for example, by a '0'), the second cell can be kept activated or deactivated, as required. The pattern indicated by the bitmap (and other parameters) can be repeated for configured number of times, for example by a further parameter, which may similar to Nu (but indicating a number of repetitions for the bitmap, rather than the number of frames).

RRC signalling could be used to communicate the activity pattern. For example, the UE may provide the activity pattern for its activity on the second network NW B to the first network NW A using RRC signalling. This could either be provided as a specific activity pattern on the second network NW B or as a UE preference for a temporary capability limitation on the first network NW A. As discussed above, this information can allow the first network NW A to configure an activity pattern for a second cell (SCell or SCG) for the UE.

The same activity attributes described above can be used to configure, in advance, an activity pattern for the UE on the second cell (SCell or SCG) of the first network NW A. The second cell can be activated and deactivated in accordance with the communicated pattern. The activity pattern configured may be overruled by additional RRC signalling by the first network NW A at any time. If the activity pattern is disabled, the UE may wait for a new network command for configuration of the second cell (SCell or SCG) on the first network NW A.

As an alternative to RRC signalling, MAC signalling may be used to communicate the activity pattern. Use of MAC signalling has the advantage of faster delivery time when compared to the use of RRC signalling. Referring to FIG.

Figures 6A, 6B:
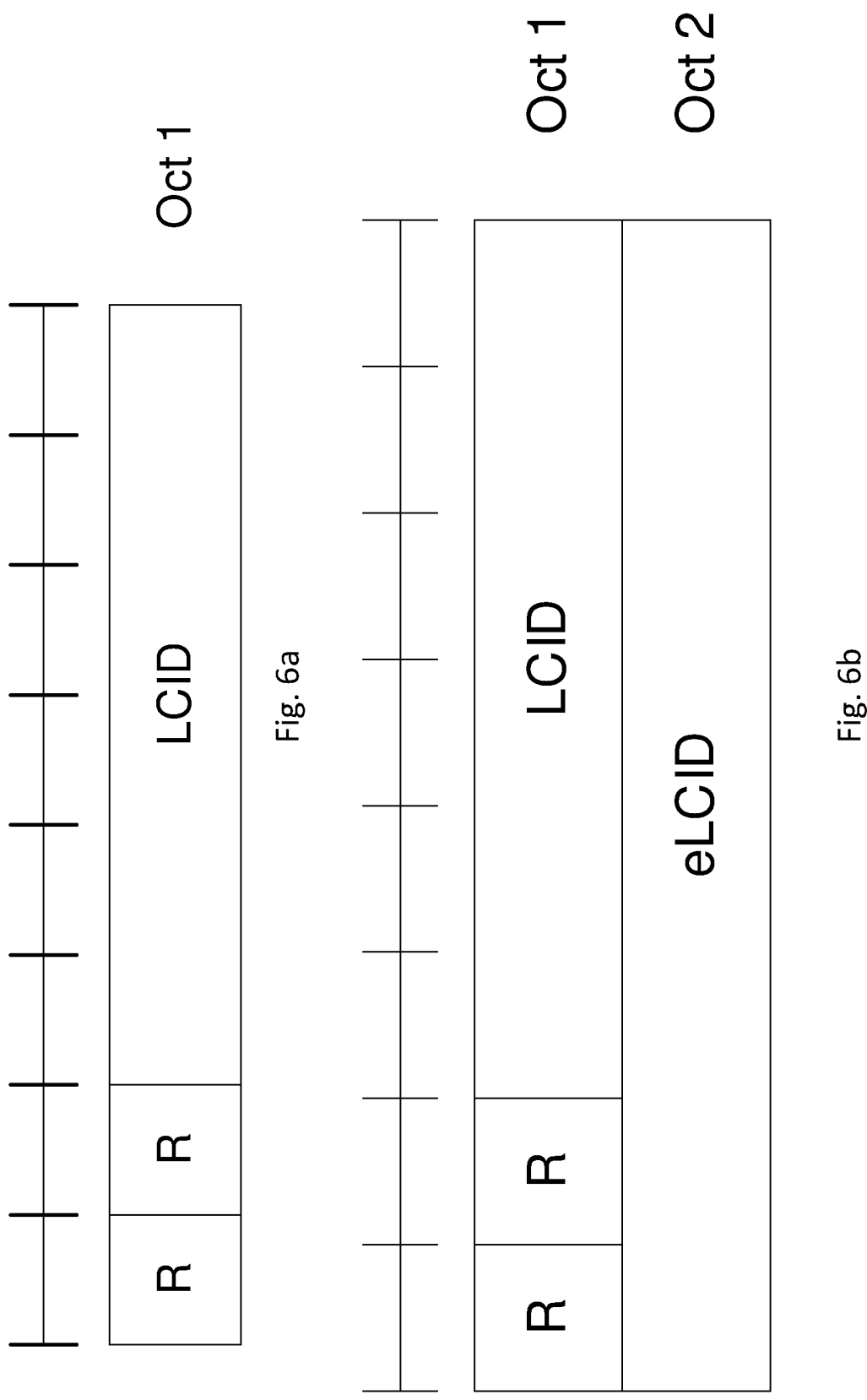
FIG. 6a illustrates a MAC CE one octet sub-header structure for indicating an activity pattern for a UE with a network according to a first implementation of a third aspect of the disclosure.
FIG. 6b illustrates a MAC CE two octet sub-header structure for indicating an activity pattern for a UE with a network according to a second implementation of the third aspect of the disclosure.

6a, there is illustrated a MAC CE one octet sub-header structure for indicating an activity pattern for a UE with a network. This comprises two reserved bits (R, set to 0) and a LCID. As an alternative, reference is further made to FIG. 6b, illustrating a MAC CE two octet sub-header structure for indicating an activity pattern for a UE with a network. This comprises two reserved bits (R), a LCID and a eLCID. Either the LCID or the eLCID can be used to represent the "activity" MAC CE. These MAC CE structures are specifically intended for control of SCG activation/deactivation.

Figures 7, 8:
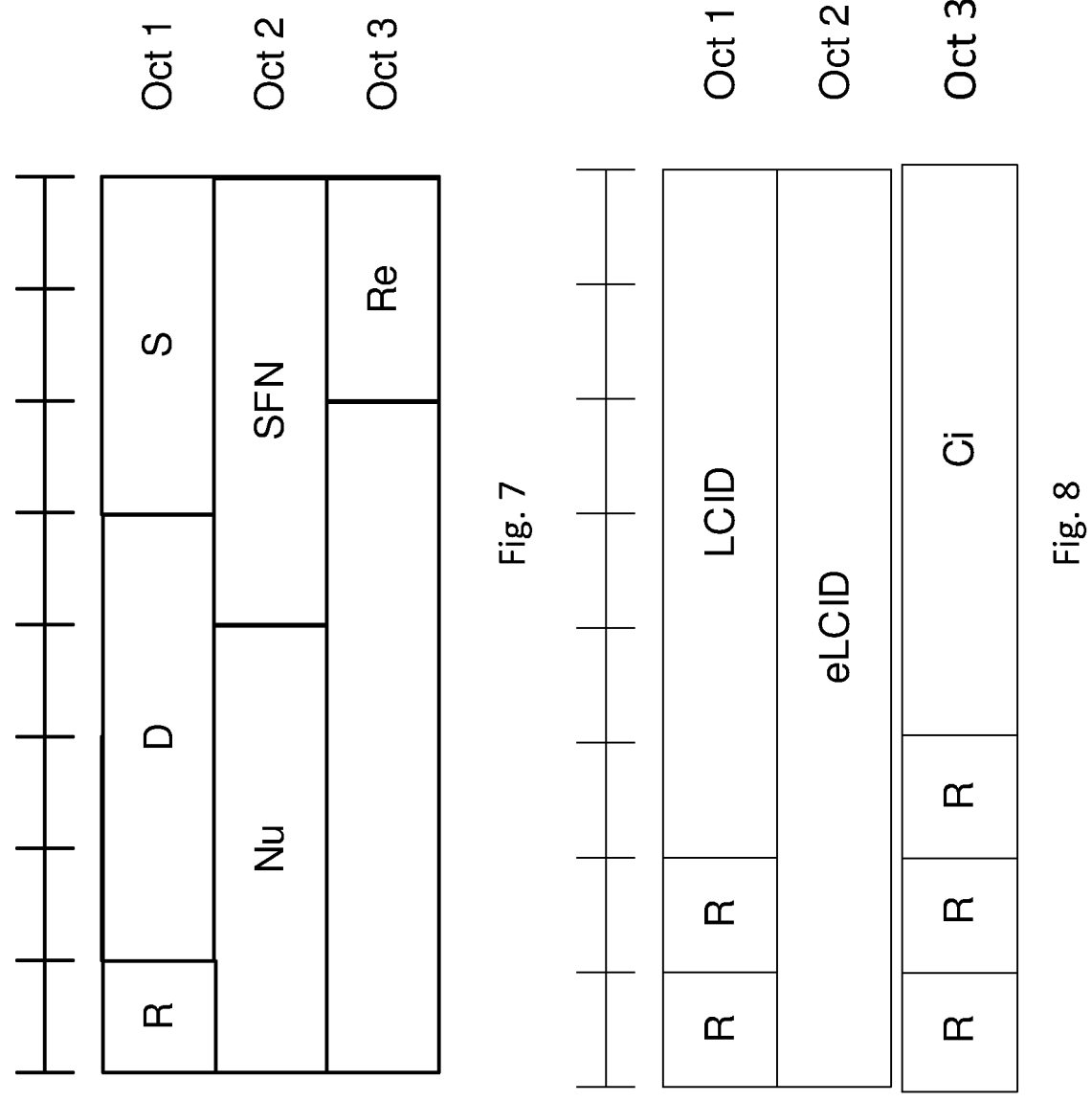
FIG. 7 illustrates a MAC CE payload structure for indicating an activity pattern for a UE with a network according to a fourth aspect of the disclosure.
FIG. 8 illustrates a MAC CE sub-header structure for indicating an activity pattern for a secondary cell according to a fifth aspect of the disclosure.

A MAC Protocol Data Unit (PDU) comprises a MAC sub-header and a payload. The payload part of the MAC PDU is now discussed according to a fourth aspect of the disclosure. Referring to FIG. 7, there is illustrated a MAC CE payload structure for indicating an activity pattern for a UE with a network. This comprises: a reserved bit (R), set to 0; and data corresponding with the activity pattern parameters identified above.

The activity duration (D) represents the duration the activity, taking place within one radio frame. The duration typically takes values of 1, 2, 3, 4, 5, 6, 7 or 8 subframes/ms. The start point of activity duration with respect to the start of radio frame (S) typically takes values of 1, 2, 3, 4, 5, 6, 7 or 8 subframes/ms. The number of radio frames (Nu) indicates the number of radio frames over which the activity pattern is repeated. The Nu field typically takes values of 0, 1, 2, 3, . . . , 15 radio frames. The system frame number (SFN) indicates the system frame where the activity pattern starts. The SFN field takes typically values of 0 to 1023. The activity repetition (Re) is given in radio frames. The Re field takes values of 0, 1, 2, 3 in radio frames.

Although the activity MAC CE structures described above are intended for SCG activity pattern communication, an activity pattern MAC CE could also be designed for communicating or instructing a SCell activity pattern. The payload format shown in FIG. 7 could still be used. However, a different sub-header format might be employed. Referring next to FIG. 8, there is illustrated a three octet MAC CE sub-header structure for indicating an activity pattern for a secondary cell (SCell). This comprises: a first octet having two reserved bits (R) and a LCID; a second octet comprising a eLCID; and a third octet having three reserved bits (R) and the SCell identity (Ci) for which the SCell activity pattern MAC CE is applied. This allows the MAC CE to be directed correctly.

Returning to the generalised sense of the disclosure discussed above, additional details can be considered. For instance, according to another aspect, there may be provided a method for configuring operation in respect of a UE configured to operate with at least one cellular network. The method comprises communicating a communication activity pattern for the UE. The communication activity pattern indicates a start time and end time for the communication activity with reference to a period of at least one radio frame, such that the at least one cellular network can be configured for communication with the UE during or excluding the time indicated by the communication activity pattern. This allows a time frame of an (optionally repeating) activity pattern to be communicated in an efficient way. Implementations according to this aspect may be in the form of a computer program (software), within a network entity of a cellular network or within a UE.

Advantageously, the end time is indicated by communication of a duration from the start time. This may be more efficient than communicated an end time with reference to the start of a radio frame. Additionally or alternatively, it may allow an end time in a different radio frame from the start time.

The start time is preferably indicated with reference to both: a time from a start of a single radio frame (for example, in terms of a number of seconds or ms or with reference to a number of sub-frames); and a number of a radio frame from a group of multiple radio frames (for example, indicating that the start is in the first radio frame of the group).

As noted above, the communication activity pattern may indicate a repetition of the communication activity with reference to the period of at least one radio frame. This period may be group of multiple radio frames discussed above. The repetition may be indicated by communicating a number of radio frames for which the communication activity is repeated (that is, the number of radio frames in the repeating group). Additionally or alternatively, the repetition may be indicated by communicating one of: a duration of the period of at least one radio frame; and a bit map indicating radio frames for which the communication activity applies.

The communicating may be in the form of RRC signalling or a MAC CE.

The at least one cellular network may include more than one cellular network. In particular, the UE may be configured to operate with a first cellular network as a first subscriber and to operate simultaneously with a second cellular network as a second, different subscriber. In some implementations, the communicating is to a network entity of the first cellular network to indicate activity of the UE with the second cellular network. The communicating may be from a network entity of the second cellular network or from the UE.

Alternatively, the communicating may be from a network entity of the first cellular network to control operation of a second cell (for example, SCG or SCell, as discussed above). In this case, the UE may be configured for simultaneous operation with the first cellular network using both a master or primary cell and a secondary cell. Then, the communicating is from a network entity of the first cellular network to the secondary cell to control activation and/or deactivation of the secondary cell according to the communication activity pattern.

Although specific embodiments have now been described, the skilled person will appreciate that various modifications and alternations are possible. It will particularly be understood that the disclosure need not be limited to the specific network architectural described and may be implemented in further evolutions of the network architecture, particularly where the same or similar network elements are used (even if their names are different).

The specific steps of communication flows and/or structures of communication elements may be varied without loss of the benefits of the disclosure. Various approaches of the present disclosure may not be limited to CA or DC operation and may be useful for other modes of operation.

The invention claimed is:

1. A method for configuring dual connectivity operation of a first cellular network, in which a User Equipment, UE, is configured to operate with the first cellular network as a first subscriber and to operate simultaneously with a second cellular network as a second, different subscriber, the UE simultaneously operating with the first cellular network using both a Master Cell Group, MCG, and a Secondary Cell Group, SCG, the method comprising:

controlling activation and/or deactivation of the SCG for paging collision avoidance, by communicating a Medium Access Control, MAC, Control Element, CE, wherein the MAC CE indicates a plurality of time periods for activation or deactivation of the SCG by indicating a time period with reference to at least one radio frame and a rate of repetition for the time period.

2. The method of claim 1, wherein the MAC CE comprises a portion to instruct either activation or deactivation of the SCG.

3. The method of claim 1, wherein the MAC CE comprises an identifier for the SCG.

4. The method of claim 1, wherein the MAC CE comprises a Logical Channel ID, LCID, portion and/or an extended LCID, eLCID, for identifying characteristics and/or a destination for data in the MAC CE.

5. The method of claim 1, wherein the step of controlling activation and/or deactivation of the SCG is in response to activity of the UE with the second cellular network.

6. A non-transitory computer readable storage medium having stored thereon computer executable instructions that, when executed by a processor as part of a device within a cellular network, cause the device to perform the method of claim 1.

7. A network entity of a cellular network, configured to perform the method of claim 1.

* * * * *